United States Patent [19]
Ronewicz et al.

[11] 3,830,192
[45] Aug. 20, 1974

[54] AUTOMATIC TRANSMISSION RATIO INDICATOR FOR USE IN THE INSTRUMENT CLUSTER OF AN AUTOMOTIVE VEHICLE

[75] Inventors: Donald J. Ronewicz, Dearborn Heights; Joseph E. Uhl, Plymouth, both of Mich.

[73] Assignee: Ford Motor Company, Dearborn, Mich.

[22] Filed: May 17, 1972

[21] Appl. No.: 254,202

[52] U.S. Cl.............................. 116/124 R, 74/473 R
[51] Int. Cl.................................................. G09f 9/00
[58] Field of Search............ 116/124, DIG. 20, 135; 74/473, 475, 484, 535, 10.7, 477 R

[56] References Cited
UNITED STATES PATENTS
2,925,061  2/1960  Thornburgh et al............ 116/124 R
3,183,884  5/1965  Daniels........................... 116/124 R
3,695,215  10/1972 Lambris.............................. 116/124

Primary Examiner—Louis J. Capozi
Attorney, Agent, or Firm—Donald J. Harrington; Keith L. Zerschling

[57] ABSTRACT

A transmission selector dial adapted to be mounted on a steering column shift lever assembly in an automotive vehicle whereby changes in the drive range selection by the vehicle operator are indicated by an indicator finger adapted to move across a drive range indicator scale on the dial, the indicator finger being connected to an actuator cable by means of a slip clutch whereby automatic calibration of the dial is achieved as the cable is adjusted to one extreme position.

4 Claims, 4 Drawing Figures

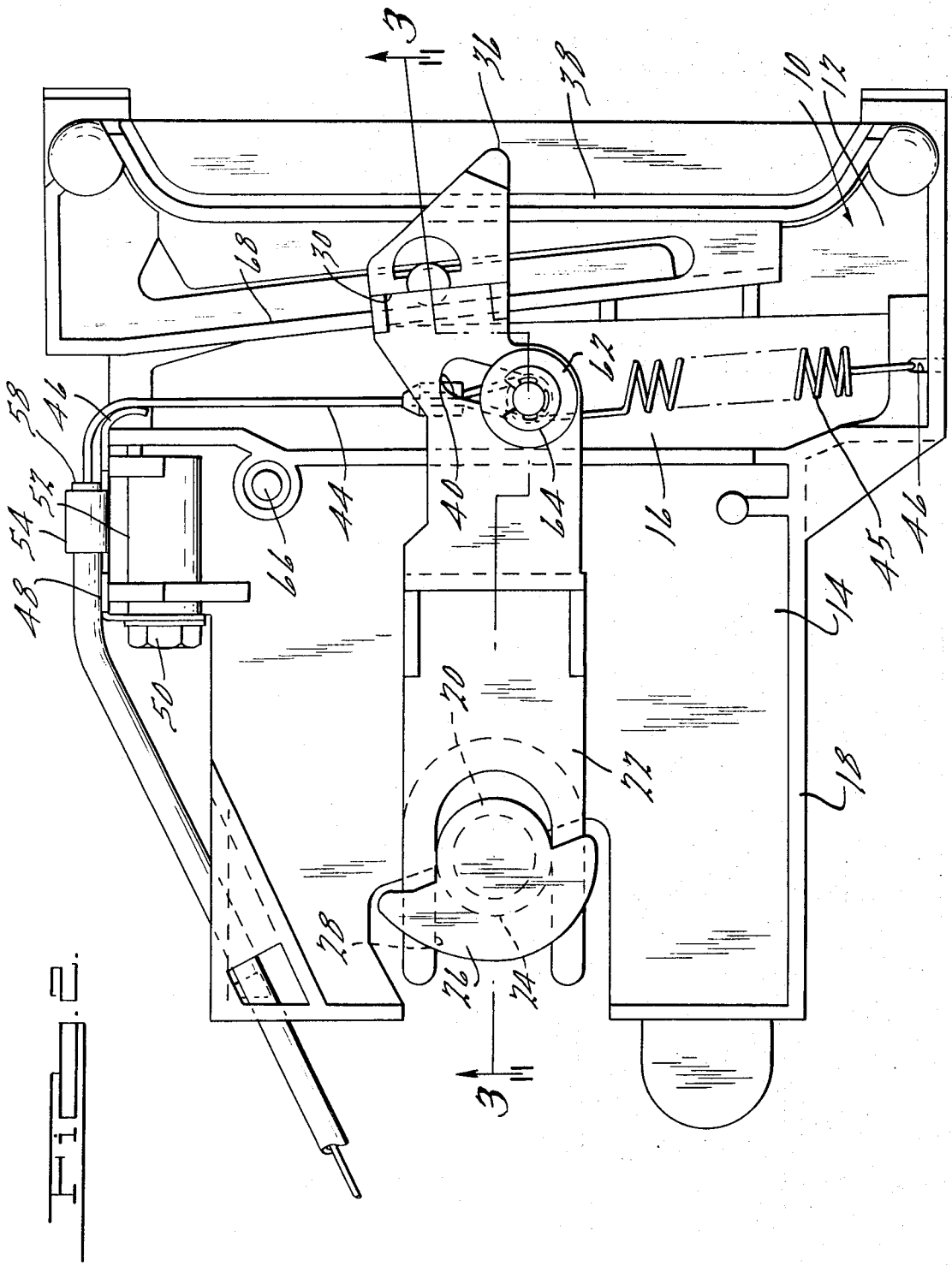

AUTOMATIC TRANSMISSION RATIO INDICATOR FOR USE IN THE INSTRUMENT CLUSTER OF AN AUTOMOTIVE VEHICLE

GENERAL DESCRIPTION OF THE INVENTION

Automatic power transmission used in contemporary motor vehicles usually include a driver controlled range selector valve. A rotary linkage member mounted on the lower portion of the vehicle steering wheel column is connected to the manual selector valve in the transmission by a suitable linkage that translates rotary motion of the shift lever to linear motion of the selector valve. The shift lever is actuated by a driver controlled selector shaft mounted for rotation on the vehicle steering column.

Each operating drive range position for the manual valve corresponds to a rotary position on the shift lever. A suitable indicator is mounted on the steering column in the view of the vehicle operator to designate the various operating positions of the shift lever that correspond to the selected transmission drive range. Such indicators usually include a lever having a pointer that moves across an indicator scale on which are designated the various drive ranges of the transmission. The pointer is carried by a pointer lever. A mechanical connection between the pointer lever and the shift lever establishes movement of the pointer across the indicator upon movement of the manual valve to its various operating positions.

During assembly of the vehicle it becomes a tedious task to calibrate properly the indicator and it becomes cumbersome and time-consuming for a person involved in the final assembly of the automobile to cause the pointer to be registered directly over the appropriate drive range indicating symbols corresponding to the appropriate drive range positions of the manual valve. Heretofore it has been necessary to provide various adjusting nuts and releasable retainer clips which can be removed and adjusted several times until perfect registry between the indicator pointer and the proper drive range designation on the indicator dial is established. The improvement of our invention makes such adjustments unnecessary.

The indicator assembly of our invention includes adjustment which provides for calibration of the pointer. This is achieved by using a flexible motion transmitting cable to establish a driving connection between the selector shaft and the pointer lever on the indicator assembly and providing a slip clutch connection between one end of the cable and the lever. A stationary portion of the indicator assembly carries a stop situated in the path of oscillation of the lever. The stop is located at a position corresponding to one extreme position of the pointer and is engaged by the indicator lever as the transmission selector shaft is moved to the corresponding limiting position of the transmission manual valve. The force supplied by the cable to the pointer lever is opposed by a return spring. When the indicator is moved in the opposite direction under the influence of the return spring upon readjustment of the selector shaft, each of the other drive range indicating symbols on the selector dial registers in sequence with the finger carried by the end of the lever. No further adjustments are required.

The presence of the slip clutch also prevents excess tensile forces in the cable which might result in cable breakage.

BRIEF DESCRIPTION OF THE FIGURES OF THE DRAWING

FIG. 2 is a plan view of the indicator dial of FIG. 1.

PARTICULAR DESCRIPTION OF THE INVENTION

Figure 1:
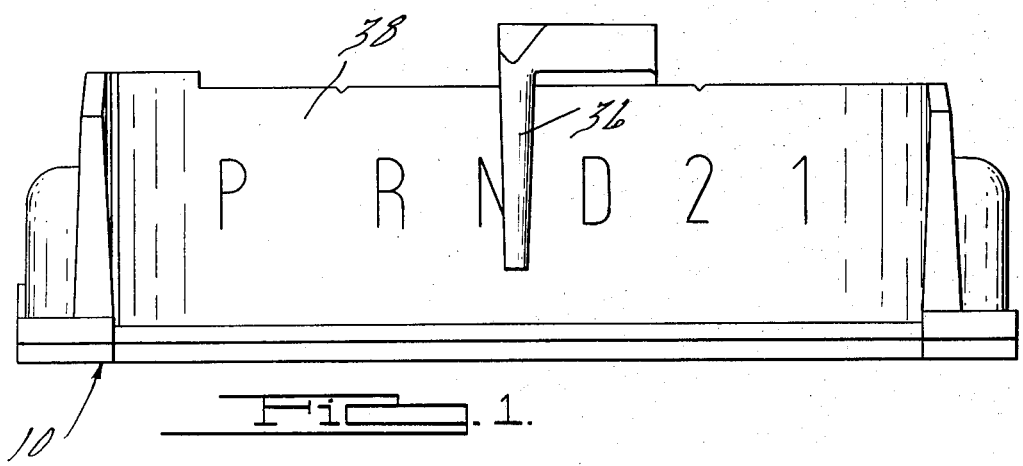
FIG. 1 shows a front view of an indicator dial adapted for mounting on the steering column within the passenger compartment of an automotive vehicle.
Figure 3:
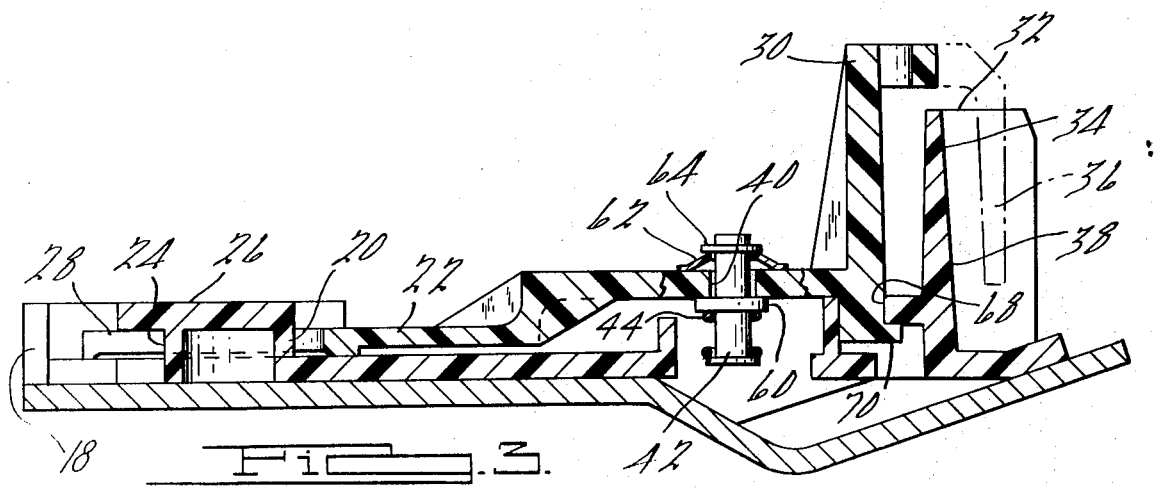
FIG. 3 is a cross sectional view taken along the plane of section line 3—3 of FIG. 2.

The indicator assembly comprises a base plate 10. It may be formed by molding if plastic material is used, or by stamping if sheet metal is used. The base is formed in two parts shown by reference characters 12 and 14. The proximate margins of the parts 12 and 14 of the base plate 10 are spaced from each other to define an opening 16.

A reinforcing rib 18 encircles the periphery of the parts 12 and 14 to provide rigidity for the base plate 10.

A pedestal 20 is formed on the upper surface of the base portion 14. This serves as a pivot member for one end of indicator lever 22. The pedestal 20 includes a circular stem 24 and a cap 26. The pivoted end of the lever 22 includes two sides that straddle the stem 24 and define therebetween a slot 28 in the end of the lever 22.

The lever 22 is generally flat and is able to oscillate about the pedestal 20 in a plane that is proximate to the surface of the base portion 14 and parallel to it. The opposite end of the lever 22 carries an upright portion 30 which overlies the upper margin 32 of the dial plate 34. An indicator pointer 36 is carried by the upright portion 30 and registers with the face 38 of the dial 34. The face 38 includes the notations P, R, N, D2 and 1, as indicated best in FIG. 1, which respectively designate the park position, reverse position, neutral position, automatic drive range position, second speed ratio drive range position and first speed ratio or low drive range position.

The intermediate portion of the lever 22 has an aperture formed therein as shown at 40. A pin 42 extends through the aperture 40 and one end of the tension spring 45 is looped over the pin 42 as indicated best in FIG. 2. The opposite end of the spring 45 is anchored at 46 to rib 18 on the margin of the base plate 10.

An actuator cable 44 has one end thereof formed with an eyelet that is looped over the pin 42. It extends around a circular guide 46 which forms a part of bracket 48. A clamping bolt 50 secures the bracket 48 to a boss 52 which forms a part of the base portion 14. Bracket 48 also has an eyelet 54 which anchors a housing or sheath 58 for the cable 44. The sheath preferably is formed of nylon so that the cable 44, which may be made of threaded or twisted steel strands, may slide through it.

Figure 4:
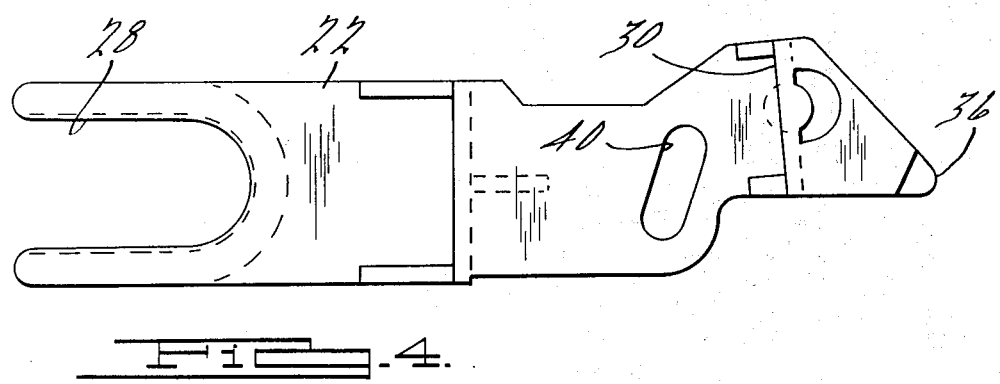
FIG. 4 is a detail view of the indicator lever and pointer which forms a part of the assembly shown in FIG. 2.

The opening 40 is elongated as indicated best in FIG. 4. A shoulder 60 engages the underside of the lever 22 adjacent the opening 40. Shoulder 60 forms a part of the pin 42. A bevel spring washer 62 engages the upper side of the lever 22 adjacent the opening 40 and is secured on the pin 42 by a suitable washer 64. When the spring washer 62 is assembled, it exerts a pressure on the upper surface of the lever 22 thereby providing a frictional driving connection between the cable 44 and the lever 22.

A stop pin 66 extends upwardly from the base portion 14 and is arranged in the path of motion of the lever 22 as the lever 22 is actuated by the cable 44. When the lever 22 engages the stop pin 66, the pointer 36 is directly situated over the position indicator symbol "1," which designates the low speed ratio drive range position.

The base portion 12 is formed with a pilot slot 68 in which is positioned a pilot stem 70 carried by the lever 22. The slot 68 extends across the base portion 12 as indicated best in FIG. 2, and is arranged at an angle so that the pointer 36 is adapted to move in a plane generally parallel to the plane of the face 38 as the lever 22 oscillates about its pivot pedestal 20.

The cable 44 may be anchored to a stationary part of the steering column assembly. The sheet may be anchored to a stationary part of the steering column assembly. The sheath or cable housing 58 may be secured to the relatively rotatable gearshift lever. Thus, when the gearshift lever is rotated, relative displacement occurs between the cable housing 54 and the cable 44. This causes the cable 44 to slide over the round cable guide 46 thereby pulling the lever 22 against the opposing force of spring 45. This causes translation of the pointer 36 across the face 38 of the indicator assembly. As this occurs, the slot 28 moves across the pedestal 20 as the pedestal 20 serves as a pivot point for the lever. The upper surface of the base acts as a bearing support for the pivoted end of lever 22.

During assembly the cable and the cable housing are connected to a steering column housing and gearshift lever as mentioned previously. When the gearshift lever is moved to the number "1" position, the lever 22 engages the stop pin 66. If the transmission manual valve is not at that time moved precisely to the low speed ratio position, the slip clutch defined by the spring 62 and the intermediate portion of the lever 22 will cause sliding movement between the lever 22 and the eyelet on the end of the cable 44.

It is immaterial whether the sheath or cable housing 58 is anchored and the cable 44 is connected to the selector shaft or vice versa. In either case movement of the pin 42 is accomplished upon adjustment of the selector shaft.

Having thus described a preferred embodiment of our invention what we claim and desire to secure by U.S. Letters Patent is:

1. An indicator assembly for indicating visually the drive range position of an automatic power transmission mechanism in an automotive vehicle driveline having a steering wheel column assembly with a rotatable transmission selector shaft, an indicator base adapted to be secured to a stationary part of said steering column assembly, an indicator lever pivotally mounted on said base for oscillation in a plane proximate to and parallel to the plane of said base, a pivot pedestal carried by said base, one end of said lever being mounted pivotally on said pedestal and being adapted to shift thereon in a radial direction relative to the pivot axis as said lever is rotated, the other end of said lever being a pilot portion carried thereon, a pilot groove formed in said base receiving said pilot portion, said groove being generally linear and situated in a direction transverse to the pivot axis of said pedestal, a pointer carried by said other end of said lever, a dial having a face secured to said base and positioned in a plane generally parallel to the plane of motion of said pointer as said lever is oscillated about said pedestal, a flexible cable secured to said lever at a location intermediate the ends thereof, a cable housing surrounding said cable, an anchor abutment in the plane of motion of said lever defining one extreme operating position of said lever, a slip clutch connecting means between said cable and said lever at said intermediate location whereby said cable may move relative to said lever as force is applied to said cable upon engagement of said lever with said abutment, said cable housing and said cable being connected to relatively movable portions of said steering wheel column assembly, one of said movable portions being said selector shaft whereby relative motion of said cable housing and said cable is effected upon movement of said selector shaft.

2. The combination as set forth in claim 1 wherein the slip clutch connecting means between said cable and said lever comprises a slot in said lever, a pin extending through said slot, a spring carried by said pin and engaging frictionally one surface of said lever and a tension spring means for urging said lever in one direction against the opposing force of said cable which tends to move said pointer toward the other extreme operating position.

3. The combination as set forth in claim 1 wherein said lever includes a flat bearing portion slidably engaging the adjacent surface of said base whereby said base provides a bearing support for said lever as the latter is pivotally oscillated about said pedestal.

4. The combination as set forth in claim 2 wherein said lever includes a flat bearing portion slidably engaging the adjacent surface of said base whereby said base provides a bearing support for said lever as the latter is pivotally oscillated about said pedestal.

* * * * *